No. 709,993. Patented Sept. 30, 1902.
J. G. MOOMY.
ARTICLE OF MANUFACTURE HAVING AN ELASTIC PORTION AND A SECURING PORTION.
(Application filed Apr. 28, 1902.)
(No Model.)
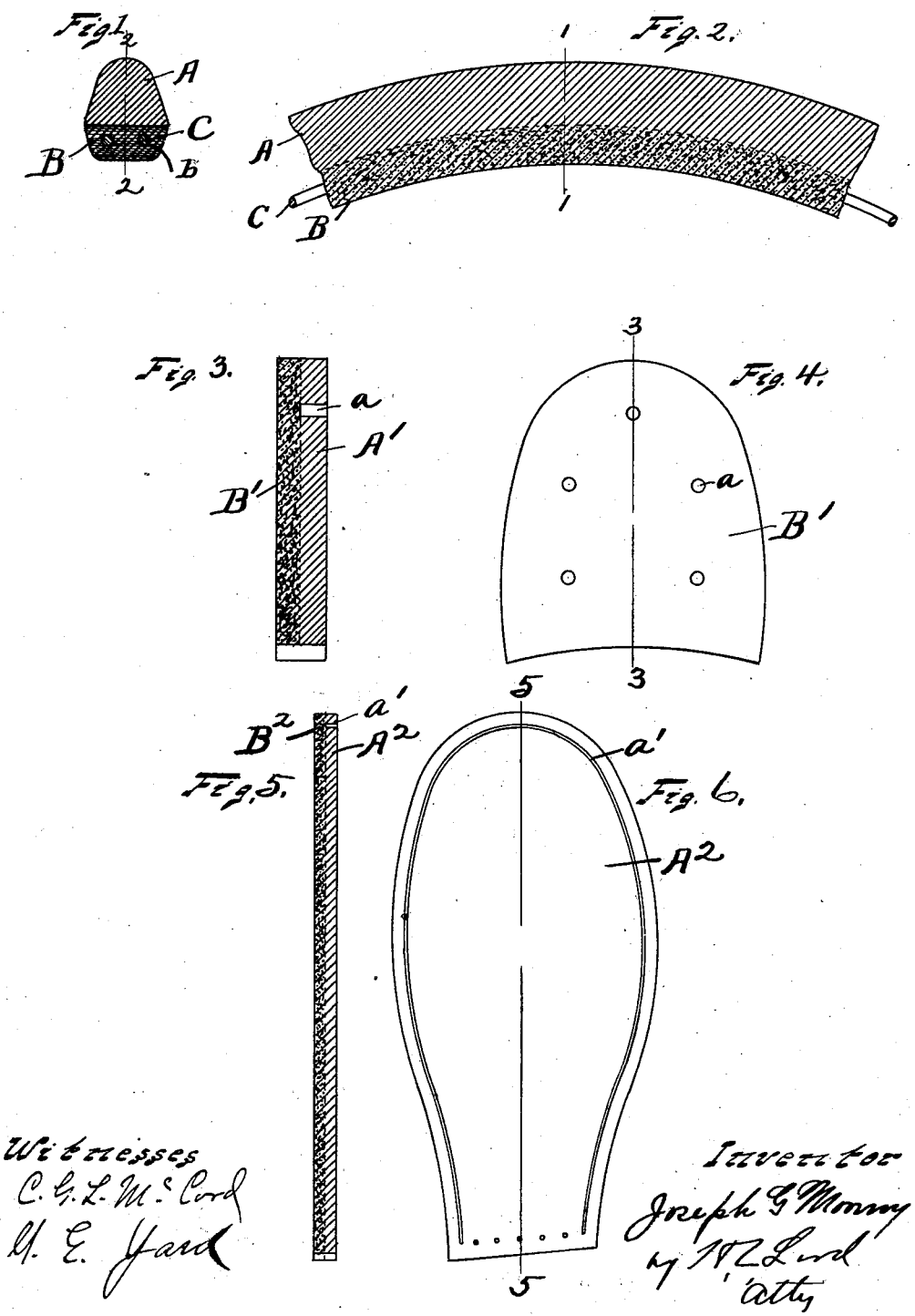

UNITED STATES PATENT OFFICE.

JOSEPH GEORGE MOOMY, OF ERIE, PENNSYLVANIA.

ARTICLE OF MANUFACTURE HAVING AN ELASTIC PORTION AND A SECURING PORTION.

SPECIFICATION forming part of Letters Patent No. 709,993, dated September 30, 1902.

Application filed April 28, 1902. Serial No. 105,015. (No model.)

*To all whom it may concern:*

Be it known that I, JOSEPH GEORGE MOOMY, a citizen of the United States, residing at Erie, in the county of Erie and State of Pennsylvania, have invented new and useful Improvements in Articles of Manufacture Having an Elastic Tread Portion and a Securing Portion, of which the following is a specification.

This invention relates to articles of manufacture having an elastic tread portion and a securing portion; and it consists in certain improvements in the construction thereof, as will be hereinafter fully described, and pointed out in the claims.

The object of the invention is to form an article having an elastic tread portion and a securing portion of such material as will unite readily with the tread portion and at the same time form a suitable body for securing it to the article on which it is to be used.

The invention is illustrated in the accompanying drawings, as follows:

Figures 1 and 2 illustrate the invention as applied to a cushion-tire, Fig. 1 being a section on the line 1 1 in Fig. 2 and Fig. 2 being a section on the line 2 2 in Fig. 1. Figs. 3 and 4 show the invention as applied to a rubber heel, Fig. 3 being a section on the line 3 3 in Fig. 4 and Fig. 4 being a plan view of the bottom of the heel. Figs. 5 and 6 show the invention adapted to a rubber sole, Fig. 5 being a section on the line 5 5 in Fig. 6 and Fig. 6 being a plan view of the bottom of the sole.

In Fig. 1, A marks the tread portion, which is preferably of rubber; B, the securing portion, which is formed of fiber-stock—that is, a stock formed of rubber or similar material and unwoven fiber. The perforations $b$ extend through the securing portion, and the wires C are arranged in the perforations for securing the tire on the wheel. The part A is of more elastic material than the fiber-stock forming the part B and, as before stated, is preferably of rubber, and, still further, both the parts A and B are preferably of the same compound of rubber, so that a perfect union is formed between the parts A and B in the same heat and with the same compound. The adaptability of this structure for this treatment is one of the important features of this invention. The tread portion has the necessary elasticity and the securing portion the necessary strength for securing it to the article on which it is used, and the two parts are so united as to form one continuous mass.

In the heel construction shown in Figs. 3 and 4 the securing portion B' is formed of fiber-stock, and this has the tread portion A' of very elastic material, preferably of rubber, and in this construction and in the others the rubber of the securing portion and the tread portion is preferably of the same compound.

The sole shown in Figs. 5 and 6 has the same characteristics as the preceding structure, the securing portion $B^2$ being of fiber-stock and the tread portion $A^2$ of some elastic material. The heel is provided with the perforations $a$, as in the usual construction, and the sole with the channel $a'$, as in the usual construction.

What I claim as new is—

1. In a rubber article of manufacture having a securing portion and an elastic tread portion, a securing portion formed of fiber-stock; and a tread portion formed of material of greater elasticity than the fiber-stock of the securing portion.

2. In a rubber article of manufacture having a securing portion and an elastic tread portion, a securing portion formed of fiber-stock; and a tread portion formed of material of greater elasticity than the fiber-stock of the securing portion, both portions being formed of the same compound.

In testimony whereof I have hereunto set my hand in the presence of two subscribing witnesses.

JOSEPH GEORGE MOOMY.

Witnesses:
  JUSTIN P. SLOCUM,
  GRACE E. YARD.